Patented June 20, 1939

2,163,250

UNITED STATES PATENT OFFICE

2,163,250

POLYMERIZATION OF HALOGEN CONTAINING UNSATURATED COMPOUNDS AND PRODUCTS PRODUCED THEREBY

Howard Warner Starkweather, New Castle County, and Arnold Miller Collins, Wilmington, Del., assignors to E. I. du Pont de Nemours & Company, Wilmington, Del., a corporation of Delaware No Drawing. Application March 19, 1936, Serial No. 69,737

27 Claims. (Cl. 260—89)

This invention relates to the polymerization of halogen-2-butadienes-1,3. More particularly it relates to the polymerization of chloro-2-butadiene-1,3 (hereinafter, for convenience, also called "chloroprene"). Still more particularly it relates to an improved method for polymerizing chloro-2-butadiene-1,3 to a plastic product in the presence of hydrogen sulfide.

Carothers and Collins in their U. S. Patent 1,950,432 disclose that by polymerizing chloro-2-butadiene-1,3 under various conditions it is possible to obtain products having a variety of degrees of solubility, plasticity, elasticity and strength. They state that light and pressure and catalysts such as oxygen and peroxides influence the polymerization.

Carothers, Collins and Kirby disclose in their U. S. Patent 1,950,438 that the character of the product may be modified by carrying out the polymerization in the presence of "inhibitors". Among the "inhibitors" they investigated were various organic sulfur compounds.

U. S. Patent 1,967,860, also issued to Carothers, Collins and Kirby, discloses that this polymerization may be carried out in the presence of various solvents.

The emulsification of chloro-2-butadiene-1,3 and its polymerization in that state to obtain a synthetic latex is disclosed in Collins' U. S. Patent 1,967,861. Ordinarily the product obtained by coagulating this emulsion after polymerization to a synthetic latex, is an elastic, non-plastic cured rubber, but if the chloro-2-butadiene-1,3 contains 1% of iodine it polymerizes to a plastic product. Collins also discloses that the addition of diluents or solvents before or after emulsification tends to impart a greater degree of softness and plasticity to the final product. Dales and Downing, in an application filed August 23, 1934, and given Serial No. 741,044 have described an improved method of emulsion polymerization involving the use of different emulsifying agents.

Williams, in his U. S. Patent 1,950,436, discloses that plastic polymers may be produced by partially polymerizing chloro-2-butadiene-1,3 and then separating the unpolymerized material. He describes a method which involves partially polymerizing chloro-2-butadiene-1,3 without the use of solvents, dispersing media, and the like. This method is hereinafter referred to as "massive" polymerization. By suitable compounding and curing, these plastic polymers can be converted into an extremely tough elastic product resembling vulcanized rubber.

It is an object of this invention to provide an improved method for polymerizing compounds of the general formula

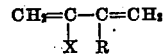

in which X is halogen and R is hydrogen or a hydrocarbon radical. A further object is to provide an improved method for polymerizing halogen-2-butadienes-1,3. A more specific object is to provide a method by which high yields of plastic polymer may be produced from chloro-2-butadiene-1,3 in a single polymerization. A still further object is to produce, in a single polymerization, high yields of a plastic polymer of chloro-2-butadiene-1,3 of good stability resembling unvulcanized Hevea rubber in its physical properties and capable of being shaped and cured to form a tough elastic mass resembling vulcanized natural rubber. Other objects will appear hereinafter.

The objects are accomplished by polymerizing compounds of the general formula

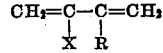

in which X is halogen and R is hydrogen or a hydrocarbon radical, and especially chloro-2-butadiene-1,3, in the presence of hydrogen sulfide. Under preferred conditions the chloro-2-butadiene-1,3 is polymerized in an emulsified form in the presence of hydrogen sulfide. The preferred dispersing medium is water.

The essential feature of the invention is that hydrogen sulfide be present as such during the polymerization. Although, as indicated above, the best results are obtained when polymerization is carried out in aqueous emulsion, it is by no means necessary that the chloroprene be in an emulsified state. On the contrary, it has been found that hydrogen sulfide is capable of promoting an improved yield of plastic polymer from these dienes under many different conditions. It is effective in massive polymerization or solution polymerization as well as in emulsion polymerization which includes not only aqueous emulsions but also nonaqueous emulsions. By "solution polymerization" is meant polymerization of the halogen diene while it is in solution either in a solvent or diluent such as benzene or carbon tetrachloride or in a polymerizable solvent such as methyl methacrylate.

The class of halogen dienes to which this invention has been found to be applicable are those which have the above general formula. The definitely preferred member of this group is chloro-2-butadiene-1,3, which, as has been previously disclosed, possesses the ability to polymerize to a rubber-like material which is similar to natural rubber. Although the other halogen dienes included in the class, which have thus far been tested, do not all possess this property to the same degree as chloroprene, they do, nevertheless, polymerize to more or less rubber-like materials and it has been found that if their polymerization is carried out in the presence of hydrogen sulfide an improved yield of a more plastic polymer is obtained as contrasted with the product obtained from the same halogen diene in the absence of hydrogen sulfide. Thus, an increased yield of more plastic polymer can be obtained from bromo-2-butadiene-1,3, and also from chloro-2-methyl-3-butadiene-1,3 when they are polymerized in the presence of hydrogen sulfide. Mixtures of two or more halogen butadienes may also be polymerized by the method of this invention.

The hydrogen sulfide may be brought into contact with the halogen diene, whether in solution, emulsion, or the massive state, in any convenient manner, such as by the direct addition of gaseous hydrogen sulfide or by the addition of a solution of hydrogen sulfide in water or in an emulsifying solution or by dissolving the hydrogen sulfide in a portion of the halogen diene to be polymerized. Also, if desired, instead of adding hydrogen sulfide as such, substances, either organic or inorganic, which generate hydrogen sulfide, such as an inorganic sulfide or sulfhydrate, for example, sodium sulfhydrate, may be added which, upon the addition of acid, will generate hydrogen sulfide. Hydrogen selenide and hydrogen telluride also could probably be employed instead of hydrogen sulfide, but their use is not desirable where their toxicity is objectionable.

A number of embodiments of the present process are described in the examples appearing hereinafter. These examples are directed to polymerization in aqueous emulsion, the preferred type, and also to massive polymerization, but it will be understood that similar considerations will apply in general to polymerization in solution, etc. Thus, the amount of hydrogen sulfide present may vary widely with reference to the amount of halogen diene. Likewise, various temperatures and pressures may be used as well as various concentrations of halogen diene in the mass in which the polymerization is taking place.

Attention is called to the fact that, in these examples, as well as throughout the specification and claims, wherever the term "parts" is used it is intended to mean "parts by weight". The examples, of course, are merely illustrative and it is not applicants' intention to be limited to the specific conditions of operation or other details therein set forth.

*Example I*

Two parts (1%) of hydrogen sulfide were added to 200 parts of chloro-2-butadiene-1,3 and the resulting mass was emulsified in 800 parts of a 2% solution of cetyl trimethyl ammonium bromide in water by passing repeatedly through a high speed centrifugal pump. The resulting emulsion was allowed to stand for 18 hours at 20° C. Two parts of phenyl-beta-naphthylamine dissolved in benzene and emulsified in 2% cetyl trimethyl ammonium bromide solution were then added. To this mixture ethyl alcohol was added until coagulation was complete. The coagulum was dried by repeated passage through a rubber mill. 169 parts of polymer were obtained, corresponding to a yield of 84.5%. The plasticity number of the product, when measured by the Williams plastometer, was 105 and the recovery 4. (The plasticity number as used herein is defined as the thickness in thousandths of an inch of a sample 2.5 cc. in volume in the form of a cylinder ⅝" in diameter, which has been heated to 80° C. for 15 min. and then kept under a weight of 5 kgs. for 3 min. at 80° C. The regain is the gain in thickness, in thousandths of an inch, of the compressed sample when freed from pressure for 1 min. at room temperature.) 100 parts of this polymer was readily compounded on a rubber mill with 5 parts of zinc oxide, 10 parts of magnesium oxide and 5 parts of rosin and cured for 60 min. at 131° C. The tough elastic product resulting had a tensile strength of 3300 lbs. and required a load of 675 lbs. for 600% elongation.

It has also been found that part of the hydrogen sulfide is consumed during polymerization. Thus, analysis of the polymer obtained by the process of this example, shows the presence of 0.36% sulfur, corresponding to 0.38% hydrogen sulfide. The products of this invention, therefore, differ chemically from all rubber-like chloroprene polymers previously described, in containing a small amount of hydrogen sulfide in chemical combination.

*Example II*

Two hundred parts of chloro-2-butadiene-1,3 were emulsified, by the method already described, in 800 parts of a neutralized 1% solution of the sodium salt of the mixed sulfate esters of cetyl and stearyl alcohols containing 0.25 part (0.125%) of hydrogen sulfide, formed by adding the equivalent amount of a concentrated solution of sodium sulfhydrate and acidifying with 10 parts of 3% hydrochloric acid. The resulting emulsion was allowed to warm spontaneously to 40° C. and then maintained at this temperature for 40 min. At the end of this time the density determined at 20° was 1.031. 2 parts of phenyl-beta-naphthylamine dissolved in benzene and emulsified in small amounts of the emulsifying agent were then added to the main emulsion mass. Coagulation was brought about by adding solid sodium chloride slowly with constant agitation until coagulation was completed. The salt and emulsifying agent were then removed by washing the coagulum with water at 50° C. on a mill consisting of corrugated rolls turning at different speeds until foaming had practically ceased. The product was dried by milling on a rubber mill with smooth cooled rolls, giving a 76.7% yield of a product. When compounded and cured as in the preceding example for 30 min., a tensile strength of 2750 lbs. was obtained, the load at 600% elongation being 500 lbs. The plastic product had an initial plasticity number of 60 with a recovery of 2.

*Example III*

Two hundred parts of chloro-2-butadiene-1,3 were emulsified and polymerized as in Example II except that only 0.12 part (0.06%) hydrogen sulfide were used and the density of the resulting latex (measured at 20° C.) after heating at 40° C. for 40 min. was 1.033. After adding phenyl-beta-naphthylamine, coagulating and drying in Example II, there was obtained an 83% yield of polymer. It had an initial plasticity number of 82 with a recovery of 2, but the plasticity number increased more rapidly on storage at 70° C. than did that of the polymer obtained by the process of Example II, thus indicating that the product was not as stable as that of Example II. On the other hand, when the polymer was compounded and cured as in Example II, a tensile strength of 3525 lbs. and a load of 1100 lbs. at 600% elongation were found.

Plastic products in high yield may also be prepared by polymerizing in the presence of hydrogen sulfide without emulsification, as illustrated in the following example:

Example IV

Three hundred eighty-two parts of chloro-2-butadiene-1,3 were treated with 0.48 part (0.125%) of hydrogen sulfide and kept at 40° C. for 14 days in a tightly stoppered bottle. 320 parts (84% yield) of a plastic polymer were obtained by milling the resulting soft gel to constant weight on a rubber mill. It was very soft, having a plasticity number of 45 and a regain of 1. When compounded as in Example I and cured for 20 minutes at 153° C., the tensile strength was 1850 lbs. and a load of 375 lbs. was required for 600% elongation.

The chloroprene used in the examples was substantially free from acetaldehyde, monovinylacetylene, divinylacetylene, methyl vinyl ketone and dichloro-1,3-butene-2. It is possible to obtain satisfactory, although somewhat inferior, results by the use of a less pure chloroprene, particularly if the polymerization is interrupted when the yield is less than with the purer material. Thus, for example, chloroprene containing 0.5% acetaldehyde, 0.3% monovinylacetylene and 2.0% dichloro-1,3-butene-2, may be used. As much as 2.0% of monovinylacetylene or acetaldehyde or methyl vinyl ketone or 10% of the dichloro-butene may be present without seriously decreasing the quality of the polymer obtained. The amount of divinylacetylene, however, should preferably be 0.1% or less. It will be understood, therefore, that this invention is not limited to the use of pure chloro-2-butadiene-1,3 or other halogen-2-butadiene-1,3, although the use of a substantially pure halogen-2-butadiene-1,3 is preferred. Accordingly the impurities mentioned above or other corresponding ones should not be present in substantial amounts, if the most desirable results are to be obtained. The halogen-butadienes may be polymerized in the presence of other materials, however, to produce useful products as is described herein.

As is apparent from the above examples this invention is not limited to the use of any particular emulsifying agent in conjunction with the hydrogen sulfide when the polymerization is to be carried out in the emulsion form. Two types of emulsifying agents have been disclosed above and applied to this invention and, in general, it may be said that any emulsifying agent or mixture of emulsifying agents may be used which is effective to produce a physically stable emulsion in an acid medium, such as is produced by the presence of the hydrogen sulfide and which emulsifying agent does not seriously inhibit the polymerization. For example, those disclosed in the Dales and Downing application, above referred to, would be suitable, although, of course, all would not give equally desirable results. Cetyl and octa decyl trimethyl ammonium bromides illustrate a preferred sub-class consisting of soluble salts of quaternary ammonium bases which contain at least one long chain aliphatic group. In general, substituted ammonium salts containing a long chain aliphatic group are suitable. Others which may be mentioned include cetyl pyridinium bromide, octadecyl betaine, octadecyl dimethyl ammonium bromide and diethylamino ethyl oleyl amide hydrochloride.

Other types of emulsifying agents which may be used are the soluble salts of (A) the sulphate esters of long chain aliphatic alcohols (such as the sodium salt of cetyl or octadecyl sulfate), of (B) sulfonated unsaturated hydrocarbons (such as the sodium salt of abietene sulfonic acid) and of (C) alkyl naphthalene sulfonic acids. The soluble salts, particularly the sodium salts of the sulfate esters of straight-chain primary aliphatic alcohols containing from 12 to 18 carbon atoms also constitute a definitely preferred class of emulsifying agents. Mixtures of these ester salts in the proportions in which the acids corresponding to the alcohols occur naturally are frequently used because of their availability. A preferred emulsifying agent of the sulfate ester type is that obtainable by sulfation of oleyl acetate followed by neutralization with sodium hydroxide.

Another type of emulsifying agent is illustrated by (D) the reaction products of a long chain primary amine with two molecules of epichlorhydrine or glycide. Dispersions of the chloroprene polymer in solutions of agents of types A, B and C may be coagulated by the addition of sodium chloride or other water-soluble salt. Dispersions containing agents of type D may be coagulated merely by making alkaline to brilliant yellow and heating to 60° C. The coagula are then washed with water to remove the salt and dispersing agent, which, if allowed to remain, would increase the difficulty of milling and also tend to decrease the quality of the cured polymer.

The amount of such emulsifying agents to be employed will, of course, depend upon the effectiveness of the particular agents. Amounts of emulsifying agent ranging from 1% to 2%, based on the water, are employed in the specific emulsions described above. Greater or less amounts of these or other similar agents may be used. The amount necessary is readily determined by experimental trial in any given case. At least an amount sufficient to prevent separation of a solid or liquid phase should be present but, if desired, more can be used. It has been observed that increasing the amount of emulsifying agent, in general, results in increasing the speed of polymerization. The present invention includes within its scope the use of all concentrations and amounts of emulsifying agents which give stable emulsions (i. e., emulsions in which a solid or liquid phase does not separate out) of halogen-butadiene in the presence of hydrogen sulfide. It is also possible to add more emulsifying agent during the course of the polymerization, if desired, either continuously or in one or more batches. Also, it is often desirable to increase the acidity of the emulsion, containing hydrogen sulfide, by addition of another acid, such as hydrochloric, for example, in such a quantity that the emulsion will turn congo red paper to a decided blue color.

As the examples demonstrate, various concentrations of hydrogen sulfide are capable of promoting an improved yield of a more plastic polymer from the chloroprene. Definite amounts ranging from 0.06% to 1%, based on the chloroprene, have been employed in these examples. The proportion of hydrogen sulfide may be varied according as a product of greater or less plasticity is desired. Although polymers made with less than 0.03% hydrogen sulfide or more than 1% hydrogen sulfide are still within the scope of this invention, the most useful products, are in general, obtained by the use of amounts of hydrogen sulfide within these limits. Much larger amounts give weak materials on curing and much smaller amounts give products lacking in plasticity. Particularly in massive polymerization, large proportions of hydrogen sulfide greatly inhibit the polymerization and hence may be used to preserve chloroprene in the unpolymerized state. A comparison of Example I with Examples II and III will show that the amount of hydrogen sulfide required to obtain a given result varies with the type of emulsifying agent used. A comparison of Examples II and IV illustrates how the use of the same proportion of hydrogen sulfide under different conditions leads to products of different properties. The use of concentrations of hydrogen sulfide ranging from 0.03% to 1%, based on the chloroprene, is particularly applicable to emulsion polymerization, especially emulsion polymerization where the chloroprene is dispersed in concentrations of 20 to 30%. It should be noted that the correspondingly preferred limits for massive polymerization will be slightly lower, equivalent results being obtained in massive polymerization as compared with emulsion polymerization when using slightly lesser amounts of hydrogen sulfide, based on the chloroprene, for example.

In emulsion polymerization and also in solution polymerization it is possible to further vary the manner of applying the invention by varying the concentration of the halogen butadiene in the emulsion or solution as the case may be. There are, of course, certain limits to the concentration of the halogen butadiene which can be dispersed in a given medium or dissolved in a given solvent. Even within these limits, however, it has not proven expedient, although it is possible, to use either extremely high or extremely low concentrations of halogen butadiene, in emulsions particularly, for various reasons. In general, it will be found most convenient to have the weight of the emulsifying solution from one to five times that of the chloroprene. Smaller amounts of solution give thick emulsions which are difficult to maintain at the desired temperature, while large proportions of emulsifying solution require inconveniently large reaction vessels and excessive amounts of coagulating agents.

It will be noted that in most of the above examples, chloroprene is dispersed in the emulsifying solution in about 20% concentration, i. e., about four times as much emulsifying solution as chloroprene. The concentration of chloroprene in the emulsion may, however, be varied from 20 to 30% and still remain within the preferred range.

The hydrogen sulfide need not all be added at one time. In either the massive or emulsion process a part of the hydrogen sulfide may, advantageously, be added during the polymerization, but since its function is to modify polymerization, it is obvious that a part of it should be present during the entire reaction in order to obtain the best results. Such variations include, for example, adding half the amount to be used, at once, and the remaining half after polymerization has proceeded for one hour or in adding the second portion after two hours, or partly after one and partly after two hours or continuously during the first one or two hours of the polymerization. The hydrogen sulfide may be added before, during or after the emulsification step. It has been observed that the formation of insoluble, granular polymer, which sometimes causes trouble in some polymerization processes, does not take place when chloro-2-butadiene-1,3 is polymerized in emulsion in the presence of hydrogen sulfide. The same is true of the formation of the volatile, odorous polymers.

The improved process described herein is, moreover, applicable not only to emulsions in water but also to the polymerization of halogen-2-butadienes-1,3 emulsified in other suitable liquids, in which the halogen-2-butadiene-1,3 can be emulsified and which do not prevent the polymerization of the halogenbutadiene and which preferably do not inhibit its polymerization, such as glycerol, glycols and formamide. Emulsions of this type are broadly disclosed in copending applications of Carothers, Serial No. 738,931, filed August 8, 1934, and Dales and Downing, Serial No. 738,929, filed August 8, 1934. It is further possible to disperse the halogenbutadiene after mixing with a solvent or diluent such as benzene and carbon tetrachloride and then polymerize it.

The emulsion of the halogenbutadiene may be prepared in any feasible manner, such as by passing the halogenbutadiene together with the emulsifying liquid through a gear pump or a centrifugal pump or by turbulent flow or by agitating the materials with a paddle or stirrer or by shaking them in a suitable container. It has been found preferable, however, to emulsify the chloroprene to form very fine particles.

While the preferred polymerization temperature lies between about 20 and 50° C., it has been found that the polymerization may be effected at temperatures ranging from 0 to 100° C. The rate of polymerization is favorably affected by increasing the temperature so that the time of polymerization required to produce similar products will change somewhat with changes in temperature. The rate of polymerization is also favorably affected by increasing the pressure and also by increasing the concentration of the emulsifying agent.

The rate of polymerization below 20° C. is, however, sometimes inconveniently slow and above 50° C. the reaction is usually very rapid and, therefore, hard to control on a large scale, and, furthermore, elaborate apparatus is generally required in order to prevent excessive losses of chloroprene and hydrogen sulfide. Increasing the temperature of polymerization reduces the tendency of both the cured and uncured polymers to become stiff and hard when kept for long periods at low temperatures.

The products produced by the processes illustrated in the above examples will naturally vary considerably in their characteristics, depending upon the particular conditions employed. The extent of polymerization (proportion of chloro-2-butadiene-1,3 consumed) has been found to have a considerable effect upon the properties of the polymer, particularly its plasticity number. It has been found that the pasticity number may be accurately controlled by determining the extent of polymerization from time to time and interrupting the polymerization (for example, by adding phenyl beta naphthylamine), when the proportion of chlorobutadiene polymerized has reached the value, determined by previous experiment, corresponding to the desired plasticity. The extent of the polymerization may be determined in a number of ways. The amount of polymer formed may be determined directly, for example by coagulating and drying a sample of the latex or, conversely, the extent of the polymerization may be determined by measuring the amount of unchanged chloro-butadiene recovered by any known efficient method (for example, distillation) from the latex or from the serum obtained by coagulation with alcohol. The density of the latex, which is approximately a linear function of the extent of polymerization, may also be used to follow the reaction. An experienced operator can also roughly estimate the extent of polymerization from the consistency of a coagulated sample. This same method can be used in massive polymerization, in which case also the consistency of the polymer may be used as a criterion. In certain cases, it may be desirable to recover the unchanged chlorobutadiene for reuse. This may be done by methods known to the art, such as removal of the chlorobutadiene by distillation from the latex or from the serum resulting from coagulation or by extraction of the coagulum by solvents such as alcohol, followed in each case by suitable purification.

When the polymerization has progressed to the desired stage, an antioxidant such as phenyl-beta-naphthylamine may be added as disclosed above. One per cent of phenyl-beta-naphthylamine, based on the chlorobutadiene is usually added but greater or somewhat less amounts are effective. Ethyl-beta-naphthyl-amine and other similar agents may be used in place of phenyl-beta-naphthyl-amine but the latter compound is preferred. It is preferably added in the form of an aqueous emulsion. Frequently it is dissolved in benzene or other suitable solvents before emulsification. The method disclosed in the examples produces very good results, but it will be understood that it may be added in any other convenient way, if desired. It may also be added after coagulation, although not so conveniently.

In emulsion polymerization the phenyl-beta-naphthyl-amine or other similar agent may be advantageously added when the polymerization has progressed to the point where it is desired to stop the polymerization since, besides functioning as an antioxidant, it also assists in arresting the polymerization as mentioned above. The point at which it is added will obviously vary widely since the polymerization may be stopped at any desired stage in its course.

The selection of the exact point at which the reaction is stopped depends upon the degree of plasticity desired in the final product, as has been indicated. In general, and particularly under preferred conditions, it has been found that very good results are obtained if the polymerization is stopped sometime after 75% of polymer has been formed.

The polymerization is ordinarily arrested when carried out in the massive state by removal of the unchanged chloroprene. This may be brought about, for example, by milling, as in Example IV, or by extraction with a solvent, such as alcohol or acetone, which dissolves the chloroprene but not its polymer.

The polymer may be isolated from the aqueous emulsion, by any suitable method, for example, by adding ethyl alcohol, as shown in Example I. The polymer may also be obtained from the latex by spray drying or by evaporation of thin films.

Unless the emulsifying agent is completely removed from the polymer in the coagulation step, it may be desirable to remove substantially all of it before the final milling. This is conveniently accomplished by washing with warm water on corrugated rolls or in an internal mixer, by which methods new surfaces of the polymer are being continuously exposed to washing medium. To assist the extraction of the emulsifying agent, alcohol, acetone or similar solvent which dissolves emulsifying agent but not the polymer, may be used.

The coagulum after being washed, if necessary, may be dried, for example, in a current of air at elevated temperatures up to about 100° C. or at subatmospheric pressure or by washing with alcohol or may be milled directly, the mechanically generated heat in the latter case assisting the removal of the water. The temperature of the polymer being milled, however, preferably will not exceed about 100° C. and is preferably much less. The rolls of the mill should, therefore, be cooled, for example, with cold water or refrigerating brine.

Volatile material can be removed to any desired extent, by any suitable method, for example, by working the coagulated polymer on a rubber mill, substantially all of it being removed by working to a constant weight. This phase of the process may be practiced in other ways, however.

It is possible to complete the polymerization in emulsion after partial polymerization in the massive form. This partial massive polymerization may be effected, for example, by allowing the chloroprene to stand in contact with a small amount of air. Care must be taken, however, not to allow the polymerization in the massive state to proceed to a point where substantial amounts of the elastic polymer are formed, if maximum yields of plastic polymer are desired.

The further polymerization in emulsion of the partially polymerized halogenbutadiene may be modified in the various particulars described above for the monomer. The hydrogen sulfide may be added either before or after emulsification or even before partial polymerization.

It has been stated above that it is generally desirable to remove substantially all of the emulsifying agent before final milling. This statement is subject to exception where an ammonium salt is used as the emulsifying agent. It has been found that the ammonium salts are capable of exerting a stabilizing effect on the plastic polymers. They tend to prevent them from losing their plasticity. It is, therefore, generally desirable to avoid removing these salts from the polymer, in so far as possible during the coagulation, washing, etc. steps.

It has also been found that halogen-2-butadienes-1,3, specifically chloro-2-butadiene-1,3, may be polymerized in the presence of other materials, such as film-forming materials, for example, polymerizable materials containing two carbon atoms in an open chain joined by more than one bond, by the methods described above, to produce similar results. A preferred embodiment involves the use of polymerizable materials of the class described, which are miscible with chloroprene. The polymerization of halogen-2-butadienes-1,3 and particularly of chloro-2-butadiene-1,3 in the presence of other materials is broadly disclosed in copending applications of Carothers, Collins and Kirby, Serial No. 665,554; 5,246; 60,882; and 60,883; filed respectively on April 11, 1933; February 6, 1935; January 25, 1936; and January 25, 1936, which have now respectively matured into U. S. Patents No. 2,029,410, No. 2,066,329, No. 2,066,330, No. 2,066,331. In general, the process of the present invention is applicable to the polymerizations described in those applications.

It is possible to carry out the process of the present invention continuously. Thus the chloroprene may be continuously emulsified by introducing it together with an emulsifying solution into a suitable emulsifier as described above, said emulsifier being of such construction that the chloroprene is thoroughly emulsified during its passage therethrough. The modifying and other agents can also be added with the chloroprene and emulsifying solution so that the emulsion withdrawn from the emulsifier is ready for polymerization. Alternately the modifying agent may be added continuously by bringing together a stream of the emulsion and a stream comprising the modifying agent. The various alternative methods described above for bringing together the starting materials for the polymerization step are applicable to the continuous formation of the emulsion to be polymerized.

The presence of hydrogen sulfide in the continuous polymerization of chloroprene is also advantageous. Such continuous polymerization may be readily effected by passing a stream comprising the chloroprene, for example, an emulsion of chloroprene containing hydrogen sulfide, through a suitable vessel, for example, a tube, maintained at the desired temperature by suitable means, such as a bath, at such a rate that the effluent product from the polymerization vessel has reached the desired stage of polymerization. Continuous polymerization in the presence of hydrogen sulfide is quite conveniently effected when the chloroprene is in an emulsified state, and, starting with the chloroprene and other ingredients of the emulsion, the plastic polymer may be produced continuously by continuously emulsifying as described above, and then passing the stream of emulsion so prepared for polymerization into the polymerization vessel and therethrough, as described above.

If desired, an antioxidant, such as phenyl-beta-naphthylamine, may readily be incorporated continuously into a stream comprising the polymer, for example, the stream issuing from the continuous polymerization vessel, by admitting into the stream comprising the polymer a stream comprising the antioxidant, the stream of antioxidant being admitted at such a rate that the desired amount of antioxidant is added.

The products of this invention, particularly those obtained from chloroprene, are plastic and readily milled, are soluble in benzene, carbon tetrachloride and similar rubber solvents, and, if they contain suitable antioxidants, they retain their plasticity and milling properties on storage at room temperature for some time. They are readily converted by heat, especially in the presence of suitable compounding ingredients at 120°–160° C., to strong tough highly elastic products resembling natural rubber in all essential points and having the additional advantage of being much more resistant to the action of organic solvents and chemical reagents generally and of not requiring the use of sulfur and organic accelerators.

Hence, it is obvious that their properties are much the same as the properties of the polymers of chloroprene described by Williams in his U. S. Patent No. 1,950,436. They may therefore be put to the same uses as he mentions for his products as well as to others not mentioned by him specifically, although included by his broad description. For example, they may be dissolved in suitable solvents such as benzene, etc., and used as coating compositions, adhesives for wood, glass, metal, paper, cloth, leather and the like, or for the impregnation of porous materials. These polymers may also be put to the uses described for the polymers of chloro-2-butadiene-1,3 produced by prior processes in the articles appearing in Ind. Eng. Chem. 25, 1219 (1933), 26, 33 (1934); and in Rubber Age for December 10, 1931, at page 213.

The polymers produced by the process of this invention are novel in that they contain small amounts of hydrogen sulfide in chemical combination, as described in Example I. This amount varies under different conditions.

As shown in the examples, the plastic product produced by the process of the present invention may be compounded and/or moulded and cured to a great variety of elastic products. A wide variety of compounding ingredients and compositions of chloro-2-butadiene-1,3 polymer have been disclosed in the "DuPrene Manual" published August 1, 1934, by E. I. du Pont de Nemours and Company as well as in U. S. Patent 1,950,436 and the Ind. Eng. Chem. articles, cited above. The methods described therein are applicable to polymers produced by the process of this invention. The nature of the compounding ingredients and the proportions in which they are used, of course, vary with the use to which the compounded polymer is to be put. In general, it may be said that the polymers of this invention may be compounded, cured and used in the manner described for the plastic polymers of chloro-2-butadiene-1,3 produced by previously known methods. Thus, while ZnO, MgO and rosin have been used in most of the examples given above, it is to be understood that carbon black and other compounding ingredients used with previously known plastic polymers of chloro-2-butadiene-1,3 may also be used with those produced by the process of the present invention. It is generally possible also to add some or all of the compounding ingredients, in the form of dispersions in water, to the latex before coagulation. It will be noted, however, that the methods of compounding and curling differ in some respects from those used for natural rubber.

Alternatively, the polymer dispersion or latex obtained as an intermediate in the course of carrying out the present invention may be used as such, with or without the addition of compounding ingredients, but preferably after the addition of antioxidants as described above. In addition, many compounding ingredients may be added to the dispersion prior to polymerization, if desired. The uses of the dispersion are, however, the same as those of natural rubber latex. Thus, for example, it may be used in the preparation of thin walled articles such as gloves and toy baloons, by dipping a form of suitable shape into the latex, withdrawing, coagulating and drying the adhering layer, and if desired repeating the process, as described by Kirby in U. S. application 572,739, filed November 2, 1931. The articles may then be made elastic by the application of heat. Similarly, latex may be advantageously used for impregnating, coating, or otherwise treating porous or fibrous materials such as paper, cloth, felt, or leather according, in part, to the teachings of Collins and Larson in U. S. Patent 1,967,863, followed, if desired, by curing by the application of heat.

The present invention, therefore, provides a method for polymerizing chloro-2-butadiene-1,3 and related compounds by which stable, plastic polymers, free from undesirable by-products and readily convertible to highly elastic, rubber-like materials of high strength, are formed rapidly, in one step and in high yield. It will further be seen that both the method of polymerization and the products obtained thereby present numerous improvements over previous inventions in this field.

It is apparent that many widely different embodiments of this invention may be made without departing from the spirit and scope thereof, and therefore it is not intended to be limited except as indicated in the appended claims.

We claim:

1. The process which comprises polymerizing, in the presence of hydrogen sulfide, a compound of the general formula

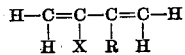

in which X is halogen and R is a member of the group consisting of hydrogen and hydrocarbon radicals.

2. The process which comprises emulsifying, in water, a compound of the general formula

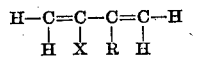

in which X is halogen and R is a member of the group consisting of hydrogen and hydrocarbon radicals, and polymerizing the dispersed compound in the presence of hydrogen sulfide.

3. The process which comprises polymerizing chloro-2-butadiene-1,3 in the presence of hydrogen sulfide.

4. The process which comprises polymerizing bromo-2-butadiene-1,3 in the presence of hydrogen sulfide.

5. The process which comprises emulsifying chloro-2-butadiene-1,3, in water, and polymerizing the dispersed chloro-2-butadiene-1,3 in the presence of hydrogen sulfide.

6. The process which comprises dispersing chloro-2-butadiene-1,3 in a liquid, in which the chloro-2-butadiene-1,3 is insoluble and which does not prevent the polymerization of the chloro-2-butadiene-1,3, in the presence of a substance which is an emulsifying agent under acid conditions, and then polymerizing the dispersed chloro-2-butadiene-1,3 in the presence of hydrogen sulfide.

7. The process which comprises polymerizing chloro-2-butadiene-1,3, in the presence of another polymerizable material containing two carbon atoms in an open chain joined by more than one bond, and in the presence of hydrogen sulfide.

8. The process which comprises polymerizing chloro-2-butadiene-1,3, in the presence of hydrogen sulfide, under conditions which permit the chloro-2-butadiene-1,3 to react with the hydrogen sulfide.

9. The process which comprises dispersing partially polymerized chloro-2-butadiene-1,3, in water, in the presence of a substance which is an emulsifying agent under acid conditions, and then further polymerizing the dispersed partially polymerized chloro-2-butadiene-1,3 in the presence of hydrogen sulfide.

10. In the process of forming a plastic polymer from chloro-2-butadiene-1,3 which is substantially free from acetaldehyde, monovinylacetylene, divinylacetylene, methyl vinyl ketone and dichloro-1,3-butene-2, the steps which comprise dispersing said chloro-2-butadiene-1,3, in water, in the presence of a substance which is an emulsifying agent under acid conditions, and polymerizing said dispersed chloro-2-butadiene-1,3 in the presence of about 0.03% to about 1% of hydrogen sulfide.

11. In the process of forming a plastic polymer of chloro-2-butadiene-1,3, the steps which comprise emulsifying said chloro-2-butadiene-1,3 in water, in the presence of an emulsifying agent of the group consisting of soluble salts of quaternary ammonium bases which contain at least one long-chain aliphatic group, soluble salts of tertiary ammonium bases which contain at least one long-chain aliphatic group, soluble salts of the sulfate esters of long-chain aliphatic alcohols, soluble salts of sulfonated unsaturated hydrocarbons, soluble salts of alkyl naphthalene sulfonic acids, the reaction products of a long-chain primary amine with two molecules of epichlorhydrine and the reaction products of a long-chain primary amine with two molecules of glycide, and then polymerizing the dispersed chloro-2-butadiene-1,3 in the presence of about 0.03% to about 1% of hydrogen sulfide.

12. In the process of forming a plastic polymer of chloro-2-butadiene-1,3, the steps which comprise emulsifying chloro-2-butadiene-1,3, in water, in the presence of a substance which is an emulsifying agent under acid conditions, and then polymerizing said dispersed chloro-2-butadiene-1,3 in the presence of about 0.03% to about 1% of hydrogen sulfide based on the weight of the chloro-2-butadiene-1,3.

13. The process which comprises emulsifying chloro-2-butadiene-1,3, in water, and polymerizing the dispersed chloro-2-butadiene-1,3 in the presence of hydrogen sulfide, and then adding an antioxidant at a point where a product of predetermined plasticity may be isolated.

14. In the process of forming a plastic polymer of chloro-2-butadiene-1,3, the steps which comprise emulsifying said chloro-2-butadiene-1,3, in water, in the presence of a soluble salt of a sulfate ester of a long chain aliphatic alcohol, containing from 12 to 18 carbon atoms, then polymerizing said dispersed chloro-2-butadiene-1,3 at a temperature of about 20° C. to about 50° C. in the presence of about 0.03% to about 1% of hydrogen sulfide based on the weight of the chloro-2-butadiene-1,3.

15. In the process of forming a plastic polymer of chloro-2-butadiene-1,3, the steps which comprise emulsifying said chloro-2-butadiene-1,3, in water, in the presence of a soluble salt of a sulfate ester of a long chain aliphatic alcohol, containing from 12 to 18 carbon atoms, the amount of chloro-2-butadiene-1,3 added being such that the chloro-2-butadiene-1,3 is present in a concentration of about 20% to about 50% in the resulting dispersion, and then polymerizing said dispersed chloro-2-butadiene-1,3 at a temperature of about 20° C. to about 50° C. in the presence of about 0.03% to about 1% of hydrogen sulfide based on the weight of the chloro-2-butadiene-1,3.

16. The process of claim 3 further characterized in that part of the hydrogen sulfide used is added during the course of polymerization.

17. The process which comprises dissolving chloro-2-butadiene-1,3 in a non-polymerizable solvent for the chloro-2-butadiene-1,3, then dispersing the solution in water and polymerizing the chloro-2-butadiene-1,3, so dispersed, in the presence of hydrogen sulfide.

18. A process which comprises dispersing chloro-2-butadiene-1,3, in an acid aqueous solution of the sodium salt of the mixed sulfate esters of cetyl and stearyl alcohols, the amount of chloro-2-butadiene-1,3 added being such that the chloro-2-butadiene-1,3 is present in a concentration of about 20% to about 50% in the resulting dispersion, then polymerizing the dispersed chloro-2-butadiene-1,3 in the presence of about 0.125% of hydrogen sulfide based on the weight of the chloro-2-butadiene-1,3 at a temperature of about 40° C., and then stopping the polymerization at a point where a product of predetermined plasticity may be isolated.

19. A polymer of a compound of the general formula

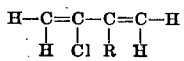

in which R is a member of the group consisting of hydrogen and hydrocarbon radicals, having in chemical combination with it a small amount of hydrogen sulfide, which polymer is obtained by polymerizing the compound of the general formula in the presence of hydrogen sulfide.

20. In a process for continuously producing a plastic polymer from chloro-2-butadiene-1,3, the steps which comprise continuously emulsifying chloro-2-butadiene-1,3 in water, in the presence of a substance which is an emulsifying agent under acid conditions, continuously adding hydrogen sulfide in an amount equal to about 0.03% to about 1% by weight of the chloro-2-butadiene-1,3 added, and continuously polymerizing the dispersed chloro-2-butadiene-1,3 in the presence of the hydrogen sulfide.

21. In a process for continuously producing a plastic polymer from chloro-2-butadiene-1,3, the steps which comprise continuously emulsifying chloro-2-butadiene-1,3 in water, in the presence of a substance which is an emulsifying agent under acid conditions, the chloro-2-butadiene-1,3 being added in such amounts that the chloro-2-butadiene-1,3 is present in a concentration of about 20% to about 50% in the resulting dispersion, continuously adding hydrogen sulfide in an amount equal to about 0.03% to about 1% by weight of the chloro-2-butadiene-1,3 added, and continuously polymerizing the dispersed chloro-2-butadiene-1,3 in the presence of the hydrogen sulfide at a temperature of about 20° C. to about 50° C., and then continuously adding phenyl-beta-naphthylamine at a point where a product of predetermined plasticity may be isolated.

22. A process which comprises dispersing chloro-2-butadiene-1,3 in an acid aqueous solution of the sodium salt of sulfated oleyl acetate, the amount of chloro-2-butadiene-1,3 added being such that the chloro-2-butadiene-1,3 is present in a concentration of about 20% to about 50% in the resulting dispersion, then polymerizing the dispersed chloro-2-butadiene-1,3 in the presence of about 0.03% to about 1% of hydrogen sulfide, based on the weight of the chloro-2-butadiene-1,3, at a temperature of about 20° C. to about 50° C. and then stopping the polymerization at a point where a product of predetermined plasticity may be isolated.

23. A plastic polymer of chloro-2-butadiene-1,3, having in chemical combination with it a small amount of hydrogen sulfide, which plastic polymer is obtained by polymerizing chloro-2-butadiene-1,3 in the presence of hydrogen sulfide.

24. A polymer of a compound of the general formula

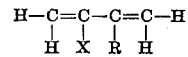

in which X is halogen and R is a member of the group consisting of hydrogen and hydrocarbon radicals, having in chemical combination with it a small amount of hydrogen sulfide, which polymer is obtained by polymerizing the compound of the general formula in the presence of hydrogen sulfide.

25. A plastic polymer of chloro-2-butadiene-1,3 obtained by polymerizing chloro-2-butadiene-1,3, dispersed in water, in the presence of hydrogen sulfide.

26. An aqueous dispersion of a plastic polymer of chloro-2-butadiene-1,3 having in chemical combination with it a small amount of hydrogen sulfide, which aqueous dispersion is obtained by polymerizing chloro-2-butadiene-1,3, while dispersed in water, in the presence of hydrogen sulfide.

27. An elastic polymer of chloro-2-butadiene-1,3 obtained by curing the plastic polymer described in claim 23.

HOWARD WARNER STARKWEATHER.
ARNOLD MILLER COLLINS.